J. A. FANCHER.
Velocipede.

No. 227,746.　　　　　　　Patented May 18, 1880.

WITNESSES:
Henry N. Miller
C. Sedgwick

INVENTOR:
J. A. Fancher
BY Munn & Co.
ATTORNEYS.

N. PETERS, PHOTO-LITHOGRAPHER, WASHINGTON, D.C.

UNITED STATES PATENT OFFICE.

JAMES A. FANCHER, OF WEST GRANBY, CONNECTICUT.

VELOCIPEDE.

SPECIFICATION forming part of Letters Patent No. 227,746, dated May 18, 1880.

Application filed January 23, 1880.

*To all whom it may concern:*

Be it known that I, JAMES A. FANCHER, of West Granby, in the county of Hartford and State of Connecticut, have invented a new and Improved Velocipede, of which the following is a specification.

Figure 1:
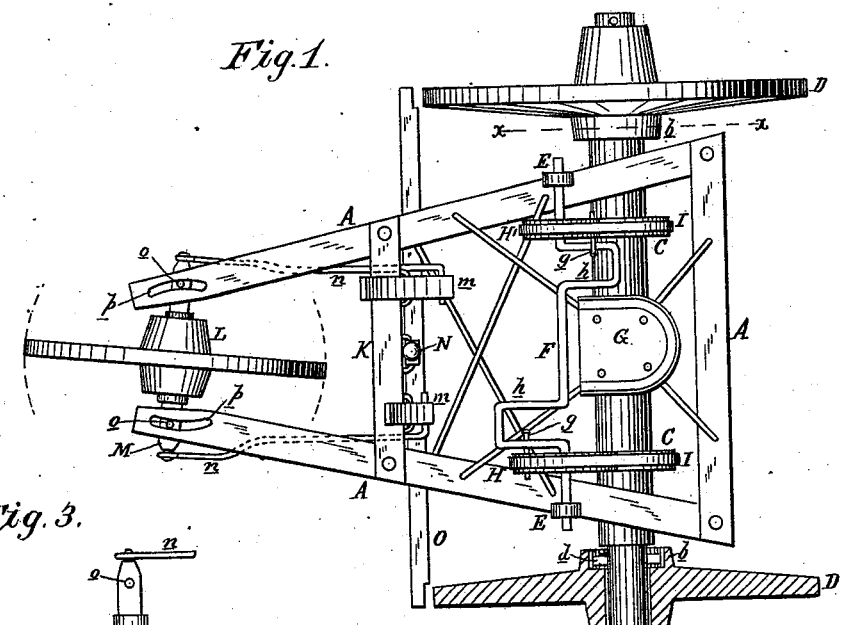
Figure 3:
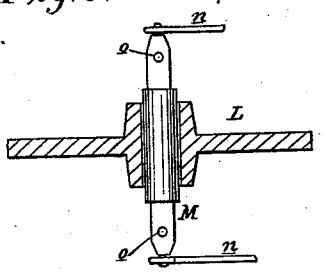
Figure 2:
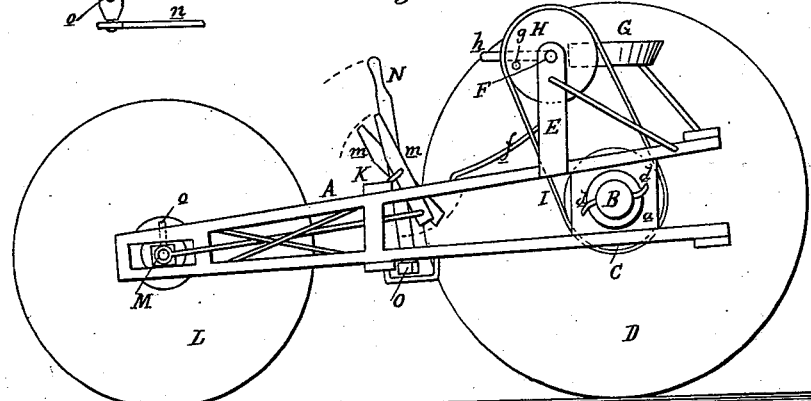
Figure 4:
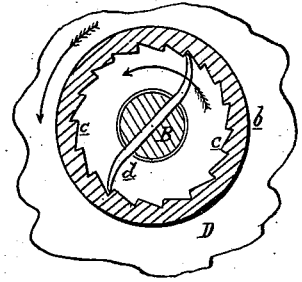

Figure 1 is a plan of the velocipede, partly in section. Fig. 2 is a side elevation of the same with one wheel removed to better exhibit other parts. Fig. 3 is a transverse sectional plan of the steering-wheel. Fig. 4 is a vertical sectional elevation of a driving-wheel hub and axle on line $x\ x$, Fig. 1.

Similar letters of reference indicate corresponding parts.

The object of this invention is to provide a velocipede whose movements can be more easily, readily, and effectively controlled than can the movement of any of the velocipedes in common use.

The invention consists in combining clutch-pulleys having movable studs with crank-shaft, belts, pulleys, axle, and drive-wheels, and in providing two unequal pulleys, that are thrown in or out of gear with a crank by movable pins, as hereinafter described.

In the drawings, A represents the frame of the velocipede, said frame being horizontal and resembling the letter A in shape, and being formed of two like A-sections, fixed one above the other and parallel with each other, and connected and held a proper distance apart by studs and bolts or other suitable devices.

Near the rear of the frame A, and between its two sections, are fixed, on opposite sides, the journal-boxes $a\ a$, that serve as bearings for the main axle B, on which are fixed, inside of the sides of the frame A, the two pulleys of equal size C C.

On the ends of the axle B, outside of the frame A, are loosely set the driving-wheels D D, on the inner faces of which, around their bores, are fastened the rings $b\ b$, that are corrugated or ratcheted on their inner circumferences, as shown at $c$, Fig. 4, and transversely through the axle B, within the rings or collars $b\ b$, are passed the pawls or stops $d\ d$, whose ends engage in these corrugations or ratchets $c$ to force the wheels D D forward, and at the same time to prevent the said wheels D D from turning backward.

The standards E, secured to the frame A just forward of the axle B, and braced by the braces $f$, support the crank-shaft F within reach of the operator, who will sit in the seat G, which is fixed on the rear cross-bar of the frame A.

On the crank-shaft F are fixed the two loose driving-pulleys H H', on either side of the crank-handles. Each of these pulleys H H' is provided with a laterally-movable stud, $g$, or other equivalent clutching device, whereby the said pulleys, or either of them, may be thrown in or out of gear with the crank-handles $h\ h$. In this instance a stud, $g$, may be drawn out, so that its head may engage against a crank-handle, $h$, in which case the said pulley is in gear with the said crank-handle $h$ and will revolve with the motion of the crank-shaft F; and if the stud $g$ be pushed inward out of contact with the handle $h$, the said pulley is out of gear and will not revolve.

It will be seen that these pulleys H H' are of different diameters, and they are connected with the driving-wheels D D by means of the endless chains or belts I I, that pass over the said pulleys H H', respectively, and their corresponding pulleys C C.

In operating this velocipede but one of the pulleys H H' is in gear at a time, and the advantages of having them of different diameters is, that in moving up an incline, when a slower motion of the driving-wheels is desirable, the larger pulley, H, can be thrown out of gear and the smaller pulley, H', in gear, so that though the operator, grasping the handles $h\ h$, shall continue to turn the crank-shaft F at the same rate of speed, the driving-wheels D D will revolve more slowly; and when, on the contrary, faster motion is desired, the pulley H' is thrown out of gear and the pulley H in gear with a handle, $h$, of the crank-shaft F.

Pivoted to the cross-bar K, in front of the seat G, and within easy reach of the feet of the operator, are the treadles $m\ m$, whose lower ends are connected with the axle M of the steering-wheel L by the rods $n\ n$, so that by pressure of the foot upon the said treadles $m\ m$, or either of them, the said steering-wheel can be moved so as to guide the velocipede in any desired direction. This steering-wheel L is fitted loosely on the axle M, which has square ends, that rest in sockets in the front end of the frame A, as shown, so that either end of the said axle M may be moved forward or backward by means of the treadles m and rods n, according to the direction in which the velocipede is to move.

The pins o, passing down through the slots p into the axle ends, prevent the excessive lateral movement of the said axle M, while they permit all necessary guiding motion.

Pivoted centrally on the cross-bar K, between the treadles m m, is the brake-lever N, to the lower end of which is fixed the transverse brake-rod O, whose ends are designed to carry suitable shoes, to be pressed, when necessary, against the peripheries of the driving-wheels D D.

Having thus described my invention, what I claim as new, and desire to secure by Letters Patent, is—

1. In a velocipede, the unequal pulleys H H', connected with the cranks of shaft F by means of a movable stud, g, as and for the purpose specified.

2. In a velocipede, the combination of the driving clutch-pulleys H H', provided with studs g, with the crank-shaft F, chains or belts I I, pulleys C C, axle B, and driving-wheels D D, substantially as and for the purposes described.

JAMES A. FANCHER.

Witnesses:
 WILBUR RUICK,
 LUCIAN REED.